A. HORST.
Ornamental Chain.
No. 221,233.  Patented Nov. 4, 1879.
Fig. 1.
Fig. 2.
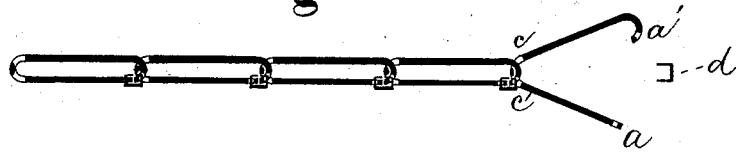
Fig. 3.   Fig. 4.   Fig. 5.
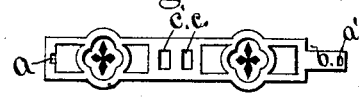  
Fig. 6.
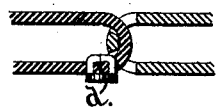
WITNESSES:   INVENTOR:

UNITED STATES PATENT OFFICE.

ADAM HORST, OF PROVIDENCE, RHODE ISLAND.

IMPROVEMENT IN ORNAMENTAL CHAINS.

Specification forming part of Letters Patent No. 221,233, dated November 4, 1879; application filed September 24, 1879.

*To all whom it may concern:*

Be it known that I, ADAM HORST, of the city and county of Providence, and State of Rhode Island, have invented a new and useful Improvement in Ornamental Chains; and I do hereby declare that the following is a full, clear, and exact description of the same, reference being had to the accompanying drawings, forming part of this specification.

This invention has reference to an improvement in ornamental chains made of stamped sheet metal, and bent so as to form an ornamental link, the links being united by passing the end of one link through openings formed in the opposite end of the link, so that the loop on the end of one link passes through the holes of the next link.

The invention consists in securing the loop to the body of the link after the links are united by a clamp, and thus uniting the same.

Figure 1 is a view of an ornamental chain the links of which are secured by my improved clamp. Fig. 2 is a sectional view, showing the method of connecting the links together and the clamp by which the same are secured. Fig. 3 is a view of one of the links before the same is bent. Fig. 4 is a view of the clamp as stamped from sheet metal, and Fig. 5 is a view of the bent-up clamp. Fig. 6 is an enlarged sectional view of the two ends of two links shown as united by the clamp.

In ornamental chains, when the links are stamped out of sheet metal, it is desirable to finish the stamped links before uniting them, and also before bending the link, so that when bent and united the chain will require no polishing or coloring.

It is also important to preserve the hardness and springiness of the metal, and to do this the links must not be subjected to heat. All soldering must be avoided, as it is costly and discolors the work.

I am aware that chains have been made by bending the link and securing the ends together by a tongue which was bent over on the inside of the link; but such tongues are made of the hard stamped metal and are liable to break off, when the whole link becomes useless, and a loss, which cannot be repaired except by soldering the link together.

In my improved ornamental chain the hole $a$ is punched or stamped into the loop $b$, and the hole $a'$ into the opposite end of the link. When the link is bent and the loop $b$ is passed through the holes $c$ $c$ of the next link, the clamp $d$ (which may be of annealed metal or hard metal) is inserted, one prong into each of the holes $a$ and $a'$, and then bent over on the inside, as shown in Fig. 6, and if one clamp should break another can be readily substituted, and when the chain breaks in wearing it can be quickly and cheaply repaired by new clamps.

These clamps may be made to form a part of the ornamental design. They may be square, round, star-shaped, or of any other desired form or color.

Having thus described my invention, I claim as new and desire to secure by Letters Patent—

In an ornamental chain, the combination, with the links, of the holes $c$ $c$, $a$, and $a'$, and the clamp $d$, arranged to secure the links together, substantially as described.

ADAM HORST.

Witnesses:
JOSEPH A. MILLER,
JOSEPH A. MILLER, Jr.